(12) United States Patent
Lerner

(10) Patent No.: US 11,655,798 B2
(45) Date of Patent: May 23, 2023

(54) MULTISTAGE VERTICAL AXIS WIND TURBINE

(71) Applicant: Daniel Maurice Lerner, Missouri City, TX (US)

(72) Inventor: Daniel Maurice Lerner, Missouri City, TX (US)

( * ) Notice: Subject to any disclaimer, the term of this patent is extended or adjusted under 35 U.S.C. 154(b) by 0 days.

(21) Appl. No.: 17/412,972

(22) Filed: Aug. 26, 2021

(65) Prior Publication Data

US 2023/0069289 A1 Mar. 2, 2023

(51) Int. Cl.
| | |
|---|---|
| *F03D 3/00* | (2006.01) |
| *F03D 3/02* | (2006.01) |
| *F03D 3/04* | (2006.01) |
| *F03D 3/06* | (2006.01) |
| *F03D 9/25* | (2016.01) |

(52) U.S. Cl.
CPC ............... *F03D 3/005* (2013.01); *F03D 3/02* (2013.01); *F03D 3/0409* (2013.01); *F03D 3/061* (2013.01); *F03D 3/062* (2013.01); *F03D 9/25* (2016.05); *F05B 2240/131* (2013.01); *F05B 2240/133* (2013.01); *F05B 2240/372* (2020.08); *F05B 2240/374* (2020.08); *F05B 2250/232* (2013.01); *F05B 2270/327* (2013.01); *F05B 2270/335* (2013.01); *F05B 2270/502* (2013.01); *F05B 2270/602* (2013.01)

(58) Field of Classification Search
CPC .......... F03D 3/005; F03D 3/02; F03D 3/0409; F03D 3/061; F03D 9/25; F05B 2240/211–214; F05B 2270/335; F05B 2270/502
See application file for complete search history.

(56) References Cited

U.S. PATENT DOCUMENTS

| | | | |
|---|---|---|---|
| 1,519,447 A | * | 12/1924 | Fortier-Beaulieu ......................... F03D 3/0409 415/4.4 |
| 2,406,268 A | | 8/1946 | Terhune |
| 3,902,072 A | | 8/1975 | Quinn |

(Continued)

FOREIGN PATENT DOCUMENTS

| | | | | |
|---|---|---|---|---|
| GB | 192405 A | * | 8/1923 | |
| GB | 2269859 A | * | 2/1994 | ............... F03D 1/04 |
| KR | 10-20130017770 A | | 8/2013 | |

OTHER PUBLICATIONS

Vortexis. https://www.vortexis.com/ Vortexis, Inc. Accessed Jul. 11, 2021.

(Continued)

*Primary Examiner* — Christopher R Legendre
(74) *Attorney, Agent, or Firm* — ePatentManager.com; Guerry L. Grune

(57) ABSTRACT

A multistage wind turbine or network of wind turbines with improved and optimized wind-directing, wind-shaping, and wind-power conversion features indicates that the shapes of these features directly affect the ability of the multistage wind turbine to use the power of moving air, such as wind, to spin a rotor and create torque on a rotor shaft to generate electricity. The wind-power-conversion mechanical efficiency described significantly improves upon previous designs by conversion of wind energy into electrical power at a superior price-to-performance ratio compared with existing alternative energy technologies.

26 Claims, 6 Drawing Sheets

(56) References Cited

U.S. PATENT DOCUMENTS

| | | | |
|---|---|---|---|
| 3,942,909 A | | 3/1976 | Yengst |
| 4,035,658 A | | 7/1977 | Diggs |
| 4,036,916 A | | 7/1977 | Agsten |
| 4,070,131 A | | 1/1978 | Yen |
| 4,309,146 A | * | 1/1982 | Hein ............... F03D 3/0409 415/4.4 |
| 4,452,046 A | * | 6/1984 | Valentin ............... F03D 9/39 60/641.11 |
| 4,474,529 A | | 10/1984 | Kinsey |
| 4,508,973 A | | 4/1985 | Payne |
| 4,832,610 A | | 5/1989 | Bond, III |
| 4,850,792 A | | 7/1989 | Yeoman |
| 5,300,817 A | * | 4/1994 | Baird ............... F03G 6/045 290/55 |
| 5,391,926 A | | 2/1995 | Staley et al. |
| 5,852,331 A | | 12/1998 | Giorgini |
| 6,015,258 A | | 1/2000 | Taylor |
| 6,518,680 B2 | * | 2/2003 | McDavid, Jr. ............ F03D 9/12 290/55 |
| 6,740,989 B2 | | 5/2004 | Rowe |
| 6,984,899 B1 | | 1/2006 | Rice |
| 7,323,791 B2 | | 1/2008 | Johnson |
| 7,400,057 B2 | | 7/2008 | Sureshan |
| 7,629,705 B2 | * | 12/2009 | Barker ............... H02J 3/381 290/55 |
| 7,942,624 B1 | | 5/2011 | Erb |
| 8,128,337 B2 | * | 3/2012 | Pezaris ............... F03D 9/25 415/4.4 |
| 8,232,664 B2 | | 7/2012 | Stroup et al. |
| 8,678,768 B2 | | 3/2014 | Sassow |
| 9,284,945 B2 | | 3/2016 | Brendle et al. |
| 9,291,150 B2 | * | 3/2016 | Bassett ............... F03D 9/25 |
| 9,598,758 B2 | | 3/2017 | Devitt |
| 9,599,095 B2 | | 3/2017 | Armstrong |
| 9,677,539 B2 | | 6/2017 | Tamatsu |
| 9,803,624 B2 | | 10/2017 | Mazur |
| 10,024,302 B2 | | 7/2018 | Zha et al. |
| 10,570,884 B2 | | 2/2020 | Burkle |
| 10,598,153 B2 | | 3/2020 | Dietzel |
| 10,612,515 B2 | | 4/2020 | Reyna et al. |
| 10,669,985 B2 | | 6/2020 | De Ruyter et al. |
| 2002/0047276 A1 | | 4/2002 | Elder |
| 2009/0256360 A1 | * | 10/2009 | Candelas Perez ...... F03D 3/005 290/55 |
| 2010/0060001 A1 | * | 3/2010 | Gabrys ............... F03D 3/005 290/44 |
| 2019/0195189 A1 | * | 6/2019 | Echenique Subiabre ............... F03B 15/00 |

OTHER PUBLICATIONS

Fan Performance Characteristics of Centrifugal Fans. Fan Engineering: Information and Recommendations for the Engineer. FE-2400. Twin City Fan. Minneapolis, MN. 2018.

SheerWinds INVELOX The New Face of Wind Power. https://www.youtube.com/watch?v=4xT9FbApY5E. Posted by Nedpower SWH, Mar. 4, 2016, YouTube. Accessed Jul. 11, 2021.

Allaei, D. and Andreopoulos, Y. INVELOX: Description of a new concept in wind power and its performance evaluation. Energy 69 (2014) 336-344.

Kjellin, J. Vertical Axis Wind Turbines. Electrical System and Experimental Results. Digital Comprehensive Summaries of Uppsala Dissertations from the Faculty of Science and Technology 981. Uppsala University. 2012.

Could this be the 'safest, most powerful wind turbine in the world'? https://www.youtube.com/watch?v=l3sSCwi4VJA Posted by Euronews Green, Oct. 1, 2020, YouTube. Accessed Jul. 11, 2021.

Nest Level Invention That Can Fight Fossil Fuels—Powerful & Safe, Wind Turbine. https://www.youtube.com/watch?v=vg7wW2nnrPU Posted by Love_Earth Go-Green, Apr. 1, 2021, YouTube. Accessed Jul. 11, 2021.

Powerpod Safe, Innovative Wind Energy. https://www.halcium.com/ Salt Lake City, UT.

Dvorak, P. Vertical axis wind turbine technology continues to improve. Windpower Engineering & Development. https://www.windpowerengineering.com/vertical-axis-wind-turbine-technology-continues-improve/ Aug. 7, 2017. Accessed Jul. 11, 2021.

Wind Amplification Turbine System. https://www.csuohio.edu/sustainability/wind-amplification-turbine-system Cleveland State University. Accessed Jul. 11, 2021.

The Wind Sphere, https://www.getsmartenergy.com/windsphere/ GreenEnergy Technologies, LLC, 2012. Accessed Jul. 11, 2021.

Wind Amplifier. Tech Briefs Create the Future Design Contest 2017. https://contest.techbriefs.com/2017/entries/sustainable-technologies/8326 Accessed Jul. 11, 2021.

Thompson, A. Rooftop Wind Power Might Take Off by Using Key Principle of Flight. Scientific American, https://www.scientificamerican.com/article/rooftop-wind-power-might-take-off-by-using-key-principle-of-flight/ Apr. 21, 2020. Accessed Jul. 11, 2021.

Koetsier, J. New 6-Bladed Vertical Axis Wind Turbines Can Power Your Off-Grid Home for 30 Years Safely. Aug. 10, 2020. Updated Aug. 25, 2020. https://www.forbes.com/sites/johnkoetsier/2020/08/10/new-6-bladed-vertical-axis-wind-turbines-can-power-your-off-grid-home-for-30-years-safely/?sh=77a3bef42ba5 Accessed Jul. 11, 2021.

Vertical Axis Wind Turbines. Conserve Energy Future. https://www.conserve-energy-future.com/verticalaxiswindturbines.php Accessed Jul. 11, 2021.

Deign, J. Floating Offshore Wind Holds Promise for Vertical-Axis Turbines. Green Tech Media. May 10, 2019. https://www.greentechmedia.com/articles/read/floating-offshore-wind-holds-promise-for-vertical-axis-turbines.

* cited by examiner

MULTISTAGE VERTICAL AXIS WIND TURBINE

FIELD OF THE INVENTION

This disclosure relates to methods, devices, and systems directed to improving wind directing, shaping, and power conversion, to create torque on a rotor shaft to generate electricity.

INTRODUCTION

Conventional wind turbine technology includes primarily single stage turbines with rotors and stators that are mostly standard designs that utilize various types of blades. The present disclosure provides for non-conventional multistage wind turbine designs that provide increased energy and cost efficiencies.

BACKGROUND

Terminology

The term "wind" in this application is meant to include "moving air", in other words air moving at some velocity.

The term "wind focus" in the present disclosure involves the acceleration of a volume of wind traveling through a restricted space which causes the wind velocity to increase by a factor that is determined by the ratio of the cross-sectional area through which the volume of wind must pass. This determination is a result of an application of the General Energy Equation, and the factor by which the wind velocity increases is according to calculations that employ the Bernoulli equation.

The term "wind expansion" in this disclosure refers to the inverse of the wind focus and as the wind expansion occurs wind velocity correspondingly decreases.

There are wind focus devices for horizontal turbines in the literature and many references to various designs which gather the wind in some type of conical device (shaped like a trumpet) which directs the wind to a smaller area thereby increasing the wind velocity. This focus wind is then often directed to a conventional standard propeller blade turbine.

The historical classification of existing wind focused turbines as horizontal designs is largely due to the necessity of a required second axis in addition to the main rotating axis of the turbine, known as the "yaw" axis. The yaw axis is necessary to point the wind gathering device (usually a trumpet-shaped conical device) towards the wind.

There is a multiplicity of horizontal wind focused turbines. Horizontal wind turbines have both advantages and disadvantages versus vertical axis wind turbines. Horizontal wind turbines are generally considered to be more efficient in the use of the wind which impacts the turbine blades. These blades are generally arranged as a propeller style rotor and must be faced into the wind to rotate. This requirement to face the blades of the turbine towards the wind requires the use of a second axis of rotation, generally known as the yaw axis, to keep the rotor portion facing the wind. Because a yaw axis is required for horizontal wind turbines there are significant mechanical difficulties in the design of horizontal wind turbines.

Horizontal wind turbines place the propeller rotor on a nacelle which is rotated by the yaw axis. This means that a large amount of weight is in a large and complex moving part at the very top of a horizontal wind turbine tower. The nacelle contains the bearings, gears and power generating machinery of the horizontal wind turbine. In addition, the power which is generated needs to be connected to the stationary tower through a type of slip ring mechanism. The yaw axis must support the entire nacelle and all of the thrust rotation and vibration provided by the horizontal wind turbine rotor blades.

Horizontal wind turbines typically have very high blade tip speed. High blade tip speed results in excessive vortex noise from the blade tips. In addition, as the blades cross the support pole or tower of the horizontal wind turbine, a large amount of turbulence is created. This turbulence creates large low frequency sonic pulses which are very disturbing to animals and humans in the vicinity of large horizontal wind turbines for many miles. There are some unusual designs which have much quieter blades, but this is a topic for another time.

vertical axis wind turbines are much simpler than horizontal wind turbines. vertical axis wind turbines have a single axis of rotation. This axis of rotation supports the rotating blades of the vertical axis wind turbine. The single rotation axis can be supported by large stationary bearings which make the mounting of the rotating blades very rugged and durable.

Most vertical axis wind turbine designs are omni-directional, that is they can capture wind energy from the entire compass circle equally. This is very important in urban locations, as the wind can change direction quickly and erratically because of all the random structures in an urban location.

vertical axis wind turbine efficiency is generally considered lower than horizontal wind turbine designs. This is questionable since there is not as much design engineering work which has gone into vertical axis wind turbine design.

The heavy generating equipment which is connected to the rotating blades of the vertical axis wind turbine can be located at the lowest point of the device. The generating machinery can also be directly mounted to the structure which supports the vertical axis wind turbine. The generated power thus directly exits the machine with standard wiring. The structure of the entire machine is less complex than the horizontal wind turbine, and therefore has the potential of being more rugged and durable.

Vertical axis wind turbines have the potential of producing less noise than horizontal wind turbines. Blade tip speeds are generally lower. In many designs there is no support tower so the blades do not cross a specific turbulence area. Some designs do produce a blade thump sound as each blade stalls once per rotation, but this is not inherent to all vertical axis wind turbine blade designs.

There are basically two types of blade designs used in vertical axis wind turbines. One designed for drag and another designed for lift. Drag blades are pushed by the fluid. Their theoretical efficiency is 15%. Lift blades are aerofoils with a theoretical efficiency that peaks out around 54%.

Vertical Axis wind turbines are quiet, safe, and do not require a tall tower. However, hardly any commercialized large Vertical Axis wind turbines have been launched despite the efforts of countless engineers. The reasons are: aerodynamic efficiency, self-starting, structural stability, and safe braking remain unresolved. These are critical problems that have to be solved for any type of wind turbine.

For the present disclosure regarding aerodynamic efficiency, the use of large wind focused stators allow for more wind capture which reduces the need for increased efficiencies. In addition, the wind is guided to only certain parts of the rotor during rotation, at specific angles of attack for efficient operations of the rotor. This results in increased efficiency since the stator normally blocks the wind from impacting the rotor during the upwind travel of the rotor blades.

For the present disclosure, self-starting is accomplished by the wind being guided to only certain parts of the rotor during rotation, at specific angles of attack. The wind, as guided by the stator, then imparts a torque vector to the rotor which produces self-starting rotor operation.

The present disclosure solves the heretofore structural instability of the rotor by providing a well-supported top bearing for the rotor. The rotor blades receive only the wind as guided by the stator at specific angles of attack, thus removing the turbulence and stall conditions that are present for most wind turbine devices that have been developed in the past.

For the present disclosure, safe braking is accomplished by the use of a generator which runs at a nearly fixed speed, by implementation of a very sharp torque speed curve, that limits the rotation rate of the rotor blades. Additionally, the wind focused stator deflects and blocks very high velocity winds. At high wind velocity, the wind will take a preferential route around the stator, because of the back pressure created by the rotor that operates at a nearly fixed speed.

SUMMARY

According to an embodiment of the present invention, a multistage wind turbine device is utilized to gather wind from a larger area and direct it towards a smaller set of mechanically rotating parts that provide for a multistage turbine.

More specifically, the present disclosure describes one or more multistage wind turbines comprising;

a first stage portion with a first static stator, a vertical axis dynamic rotor that has vertical axis turbine blades attached to at least a single rotational drive shaft that rotates the single drive shaft in either a clockwise or counterclockwise direction and at least a second stage portion with a second stator and an axial rotor that includes second rotor axial turbine blades attached to the single rotational drive shaft wherein the first stage portion utilizes airflow directed into the multistage vertical axis wind turbine blades from wind sources to provide torque that overcomes a rotational drive shaft inertial static force so that the vertical axis turbine blades move rapidly enough to force rotation of the single rotational drive shaft and such that the airflow continues past the vertical axis turbine blades through a conical portion contained within the first rotor and toward second stator axial turbine blades whereby the axial rotor provides additional torque that adds rotational force to the single rotational drive shaft wherein the single rotational drive shaft provides energy to one or more energy conversion devices.

In addition, the second stator is attached to a venturi top section that includes one or more vanes within the venturi top section such that air flow continues through the second stator axial turbine blades, enters the venturi top section, and exhausts through a low-pressure zone created by the venturi top section.

The low-pressure zone contains a pressure lower than ambient pressure that exists without exhaust of the air flow from the venturi top section.

Herein, the conical portion itself acts as a second stator for the second rotor.

Further, the conical portion includes one or more curved sections.

Still further, the conical portion includes one or more curved vanes.

The first and second stages of the multistage wind turbines are an initial tandem stage in that one or more sets of additional tandem stages can be added to the initial tandem stage.

In an additional embodiment, a power system for converting wind energy to another form of energy comprises; an energy conversion device such as a generator that operates by generating energy from rotation of the single rotational drive shaft connected to the multistage wind turbine and also connected to the generator wherein the generator also includes a tachometer that measures speed of the rotational drive shaft and a controller that controls an ability to convert kinetic mechanical energy from the rotational drive shaft of the generator to an output energy load wherein the controller also measures a rotational speed of the rotational drive shaft and utilizes measurement of a rotational speed of the rotational drive shaft in order to control conversion of a desired amount of kinetic mechanical energy to load energy.

Another form of energy is described as a form of potential energy and/or kinetic energy that is subsequently converted into load energy that is electrical energy, mechanical energy and/or thermal energy.

The generator can include an induction generator, a hydraulic power unit including a pump, an air compressor, a synchronous electrical generator, a variable reluctance generator wherein reluctance is a measurement of an ability of a magnetic field to pass through a substance, an electric motor, a permanent magnet electric motor, a brush motor, and an electrostatic motor.

The controller also provides for connection and engagement of the generator to the energy load with one or more valves that control flow of generated energy to the load energy that engages when measurement of shaft speed by the tachometer is greater than a predetermined speed.

Predetermined speed is dependent on a minimum amount of energy generation that produces an amount of energy needed to provide useful load energy wherein useful load energy must be greater than a potential and/or inertial energy required to operate devices.

The term "valves" for the purposes of this disclosure includes electrical contactors, switches, relays, solid state electronic devices, transistors, FET (field effect transistors), MOSFET (metal oxide field effect transistors), SCR (silicon controlled rectifier), TRIAC (TRIode (for) Alternating Current), vacuum sealed electronic devices (vacuum tubes), gas filled electronic devices, solenoids, gate valves, variable frequency electric converters, variable voltage converters, variable current electrical converters, and battery chargers.

In a further embodiment, a network of multistage turbines wherein the multistage wind turbines comprises;

a first stage portion with a first static stator, a vertical axis dynamic rotor that has vertical axis turbine blades attached to at least single rotational drive shaft that rotates the single drive shaft in either a clockwise or counterclockwise direction and at least a second stage portion with a second stator and an axial rotor that includes second rotor axial turbine blades attached to the single rotational drive shaft wherein said first stage portion utilizes airflow directed into the multistage vertical axis wind turbine blades from wind sources to provide torque that overcomes a rotational drive shaft inertial static force so that the vertical axis turbine blades move rapidly enough to force rotation of said single rotational drive shaft and such that the airflow continues past the vertical axis turbine blades through a conical portion contained within the first rotor and toward second stator axial turbine blades whereby the axial rotor provides additional torque that adds rotational force to the single rotational drive shaft wherein the single rotational drive shaft provides energy to one or more energy conversion devices.

The network of multistage wind turbines includes one or more controllers that control the multistage wind turbines such that collective wind for inoperative single multistage wind turbines can be overcome by use of the network whereby the network feeds additional energy and power into any single multistage wind turbine that requires additional energy and power to initiate or maintain operations.

The network communicates via energized signals over wired or wireless, light beams, lasers, power lines, and satellites.

The network is further controlled by bidirectional signals transmitted from one more local or remote controllers that can transmit receive or transceive and that include data storage capabilities which are securitized and/or encrypted.

The present disclosure also describes a method for increasing energy and power efficiency from wind comprising; utilizing one or more multistage wind turbines, wherein the multistage wind turbines include a first stage portion with a first static stator, a vertical axis dynamic rotor that has vertical axis turbine blades attached to at least a single rotational drive shaft for rotating the single rotational drive shaft in either a clockwise or counterclockwise direction and at least a second stage portion with a second stator and an axial rotor that includes second rotor axial turbine blades attached to the single rotational drive shaft wherein the first stage portion utilizes airflow directed into the multistage vertical axis turbine blades from wind sources for providing torque for overcoming rotational drive shaft inertial static forces so that the vertical axis turbine blades are moving rapidly enough forcing rotation of said single rotational drive shaft and such that the airflow flows past said vertical axis turbine blades through a conical portion contained within the first rotor and toward second stator axial turbine blades whereby the axial rotor provides additional torque adding rotational force to the single rotational drive shaft wherein the single rotational drive shaft is providing energy to one or more energy conversion devices.

In addition, the second stator is attached to an air exhaust venturi top section that includes one or more vanes within the air exhaust venturi top section such that air flow continues through the second stator axial turbine blades and escapes through a low-pressure zone created by the air exhaust venturi top section.

Further, the low pressure zone contains a pressure lower than ambient pressure that exits without the air exhaust venturi top section.

In one embodiment, the conical portion itself acts as a second stator for the second rotor.

Additionally, the conical portion includes one or more curved sections.

Moreover, the conical portion includes one or more curved vanes.

Furthermore, the first and second stages are an initial tandem stage in that one or more sets of additional tandem stages can be added to the initial tandem stage.

This power system for converting wind energy to another form of energy comprises; an energy conversion device such as a generator that operates by generating energy from rotation of the single rotational drive shaft connected to the multistage wind turbines and also connected to the generator wherein the generator also includes a tachometer that measures speed of the rotational drive shaft and a controller that controls an ability to convert kinetic mechanical energy from the rotational drive shaft of the generator to an output energy load wherein the controller also measures a rotational speed of the rotational drive shaft and utilizes measurement of a rotational speed of the rotational drive shaft in order to control conversion of a desired amount of kinetic mechanical energy to load energy.

Here another form of energy is a form of potential energy and/or kinetic energy that is subsequently converted from captured or provide wind energy into load energy. The load energy can be electrical energy, mechanical energy and/or thermal energy.

The generator can be an induction generator, a hydraulic power unit including a pump, an air compressor, a synchronous electrical generator, a variable reluctance generator wherein reluctance is a measurement of an ability of a magnetic field to pass through a substance, an electric motor, a permanent magnet electric motor, a brush motor, and an electrostatic motor.

The controller also provides for connection and engagement of the generator to the energy load with one or more valves that control flow of generated energy to the load energy that engages when measurement of shaft speed by the tachometer is greater than a predetermined speed.

The predetermined speed is dependent on a minimum amount of energy generation that produces an amount of energy needed to provide useful load energy wherein useful load energy must be greater than a potential and/or inertial energy that must be overcome as required to operate devices.

Again, the valves described herewithin include electrical contactors, switches, relays, solid state electronic devices, transistors, FET (field effect transistors), MOSFET (metal oxide field effect transistors), SCR (silicon controlled rectifier), TRIAC (TRIode (for) Alternating Current), vacuum sealed electronic devices (vacuum tubes), gas filled electronic devices, solenoids, gate valves, variable frequency electric converters, variable voltage converters, variable current electrical converters, and battery chargers.

DETAILED DESCRIPTION OF THE DRAWINGS

Figure 1:
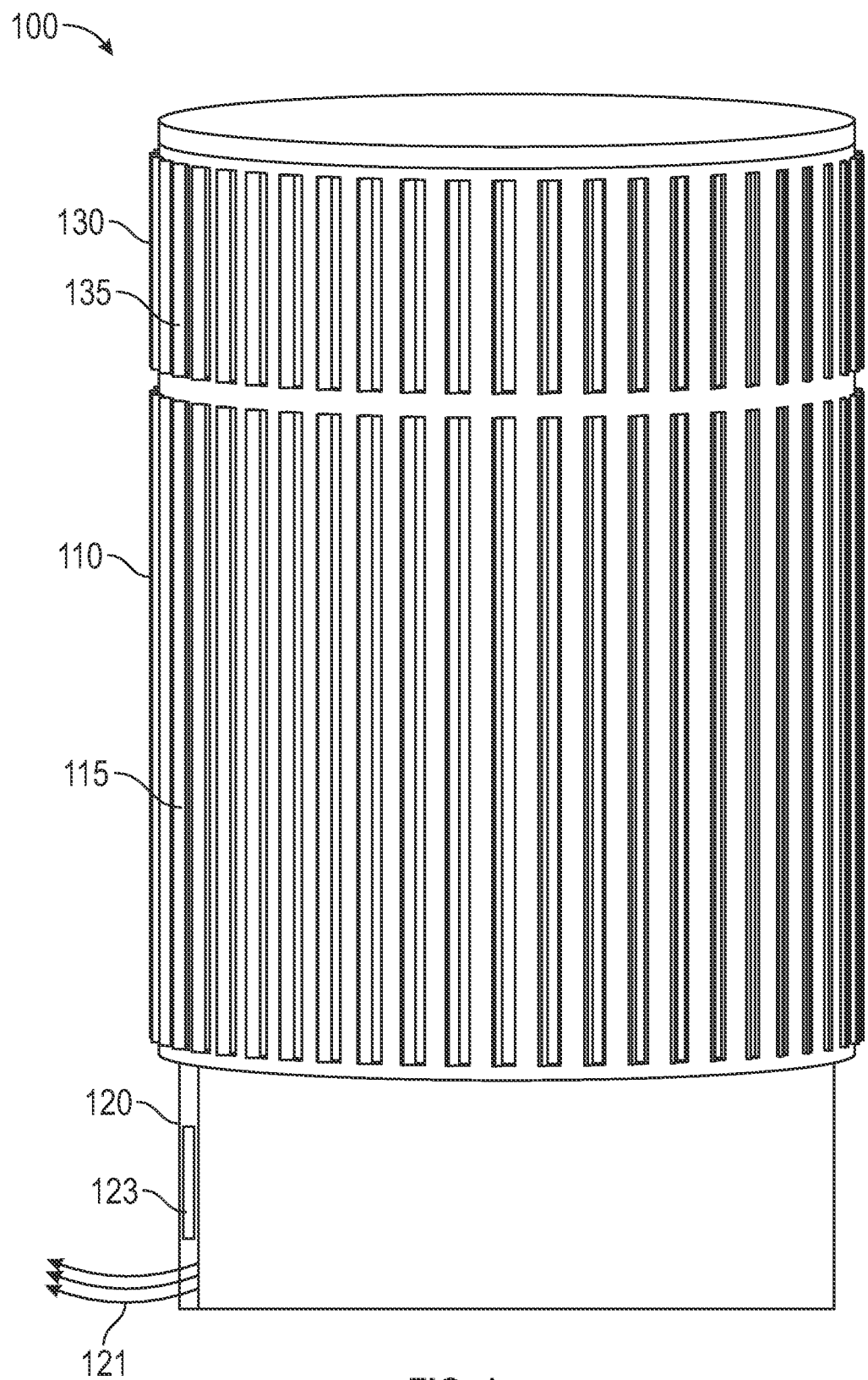
FIG. 1 is a frontal external view of the multistage turbine.

FIG. 1 is a frontal external view of the multistage turbine (100). The multistage turbine (100) includes two stages, the first stage and second stage turbine housing (110) which includes a first stator and vertical axis rotor and the second stage with a second stator and an axial rotor. This housing provides wind vanes (115) that provide for wind entry and collection and eventual exit. The bottom portion is connected to first and second stage housing (110) and provides a housing for the energy conversion unit (120) which is often a generator that includes wires for power connections (121).

In addition, there is a controller access panel (123). The top portion is a venturi top section (130) that is optional and connected to the first and second stage turbine housing (110) to complete the outer housing requirements for the multistage wind turbine. This venturi top section also includes wind vanes (135) for wind entry, collection and eventual exit.

Figure 2:
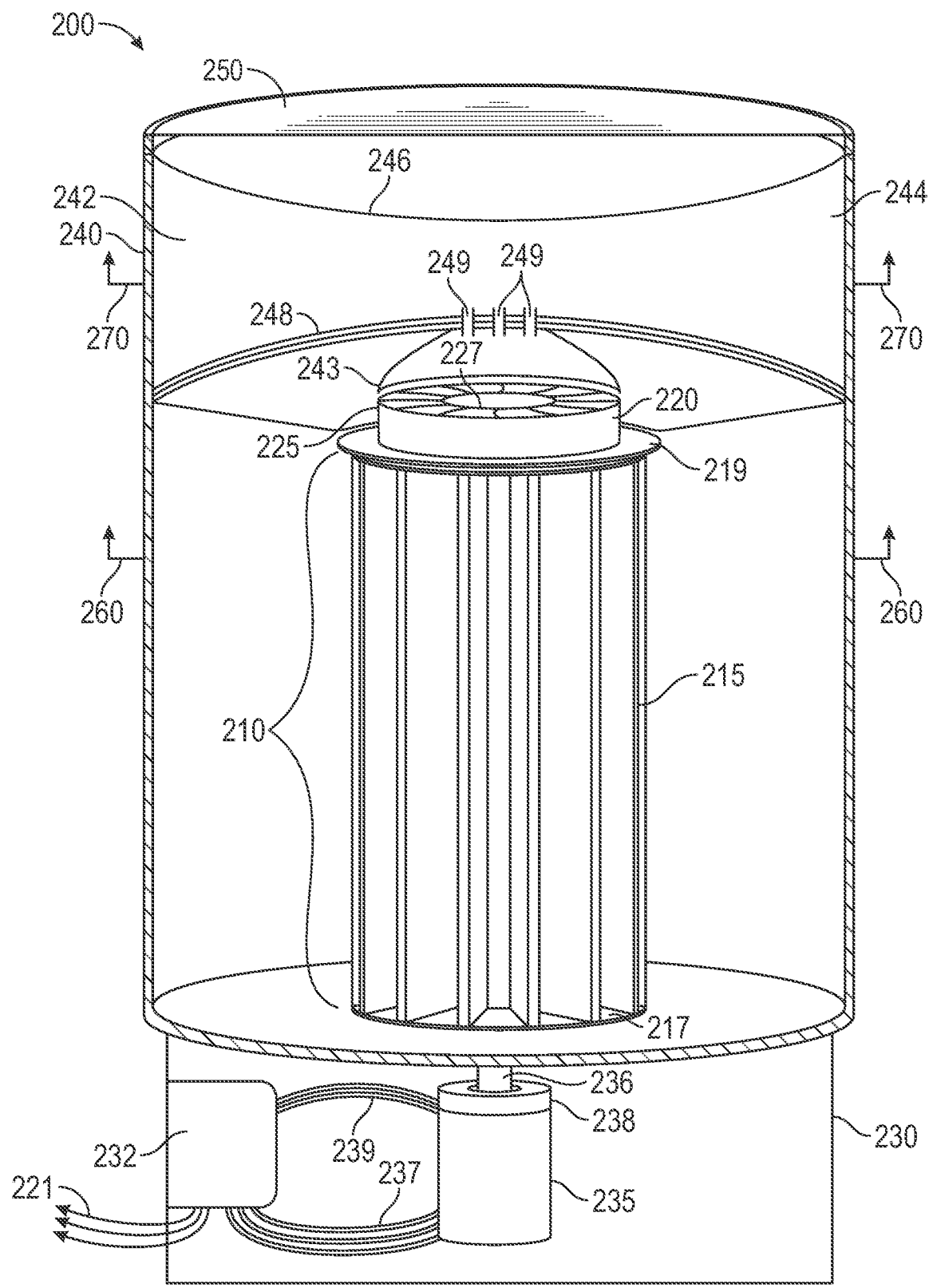
FIG. 2 is a cut-away view of the multistage turbine.

FIG. 2 is a cut-away view removing the housings from the multistage wind turbine (200) so that the internal sections can be described. The vertical axis turbine rotor (210) is shown in the center of the diagram and includes the vertical axis blades (215) that are mounted on a bottom rotating support (217) and top rotating support (219). The second stage axial rotor (220) is attached to the vertical axis turbine rotor (210) so that the two rotors can rotate tandem. The second stage rotor (220) also has axial blades (225) with a top cover plate (227). The base portion (230) includes the generator (235) with a single rotational drive shaft (236) which connects the generator (235) to both the vertical axis turbine rotor of the first stage (210) and the axial rotor of the second stage (220). The generator (235) is also connected with at least two wires (237) that pass from the generator (235) to the controller (232). The wires for power connection from the generator (235) to the energy conversion devices (not shown) are also shown in FIG. 2 as (221). In addition, there is a tachometer (238) with its own set of wires (239) that connect the output from the tachometer (238) to the controller (232). It is important to realize that the tachometer (238) is either directly or indirectly attached to the single rotational shaft (236). The tachometer (238) functionality can be accessed by utilizing electrical circuitry (not shown) connected to the power wires (237).

An optional top portion is the venturi top section (240) which consists of at least one inlet wind passage way (242) and at least one wind exit passage way (244) where the venturi top section (240) includes both a top wind passage way (246) and a bottom wind passage way (248). The bottom wind passage way (248) includes holes or openings (249) primarily existing in the middle portion of the bottom wind passage way (248). In addition, there exists a wind exhaust funnel (243) located between the second stage axial rotor (220) and the venturi top section bottom wind passage way openings (249). The top wind passage way (246) is connected to a top cover (250) that is also part the outer housing (130 from FIG. 1).

Figure 3:
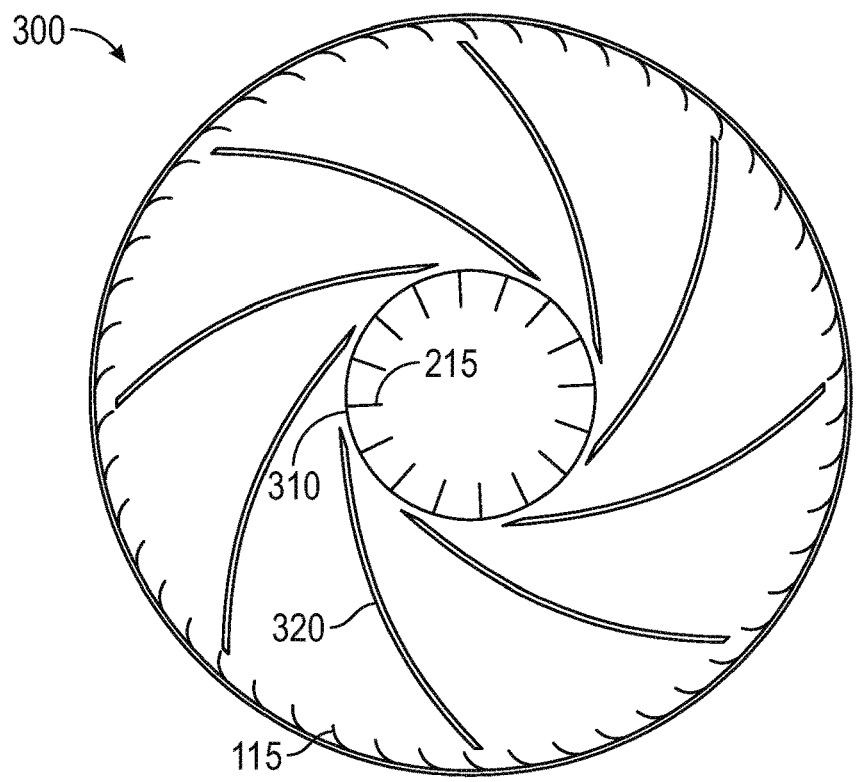
FIG. 3 provides the cross-sectional view of the vertical axis rotor and stator.

Arrows (260) from FIG. 2 are provided which indicate the cross-sectional view of the vertical axis rotor and stator (300) as shown in FIG. 3. This vertical axis rotor and stator includes three basic portions. The wind vanes (315) corresponding to (115) in FIG. 1. A multiplicity of stator blades (320), which as shown in this figure are angled tangentially to the vertical axis rotor (310) which corresponds to (210) in FIG. 2. These stator blades (320) also concentrate the passage of wind to increase wind velocity which drives the vertical axis rotor (310). These stator blades (320) may be bendable, malleable, and pivotable in order to manage high velocity wind condition. In addition, there are also a multiplicity of vertical axis rotor blades (315) which corresponds to (215) in FIG. 2.

Figure 4:
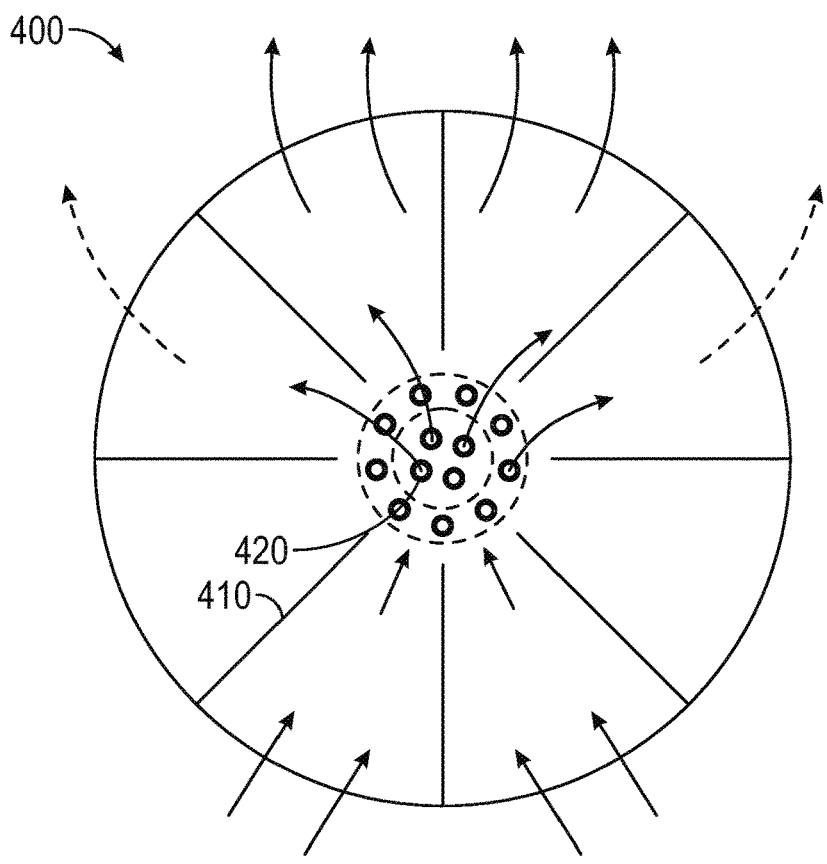
FIG. 4 is a cross-sectional view of the venturi top section with venturi wind flow veins.

Arrows (270) from FIG. 2 are provided which indicate the cross-sectional view of the venturi top section (400) (130 from FIG. 1) with venturi wind flow veins (410) as shown in FIG. 4. There are a multiplicity of the venturi wind flow veins (410) which both guide and concentrate the wind flow through the top wind passage way (246) and bottom wind passage way (248) sections of FIG. 2. The (holes) openings (420) are also shown which correspond to (249) in FIG. 2.

Figure 5:
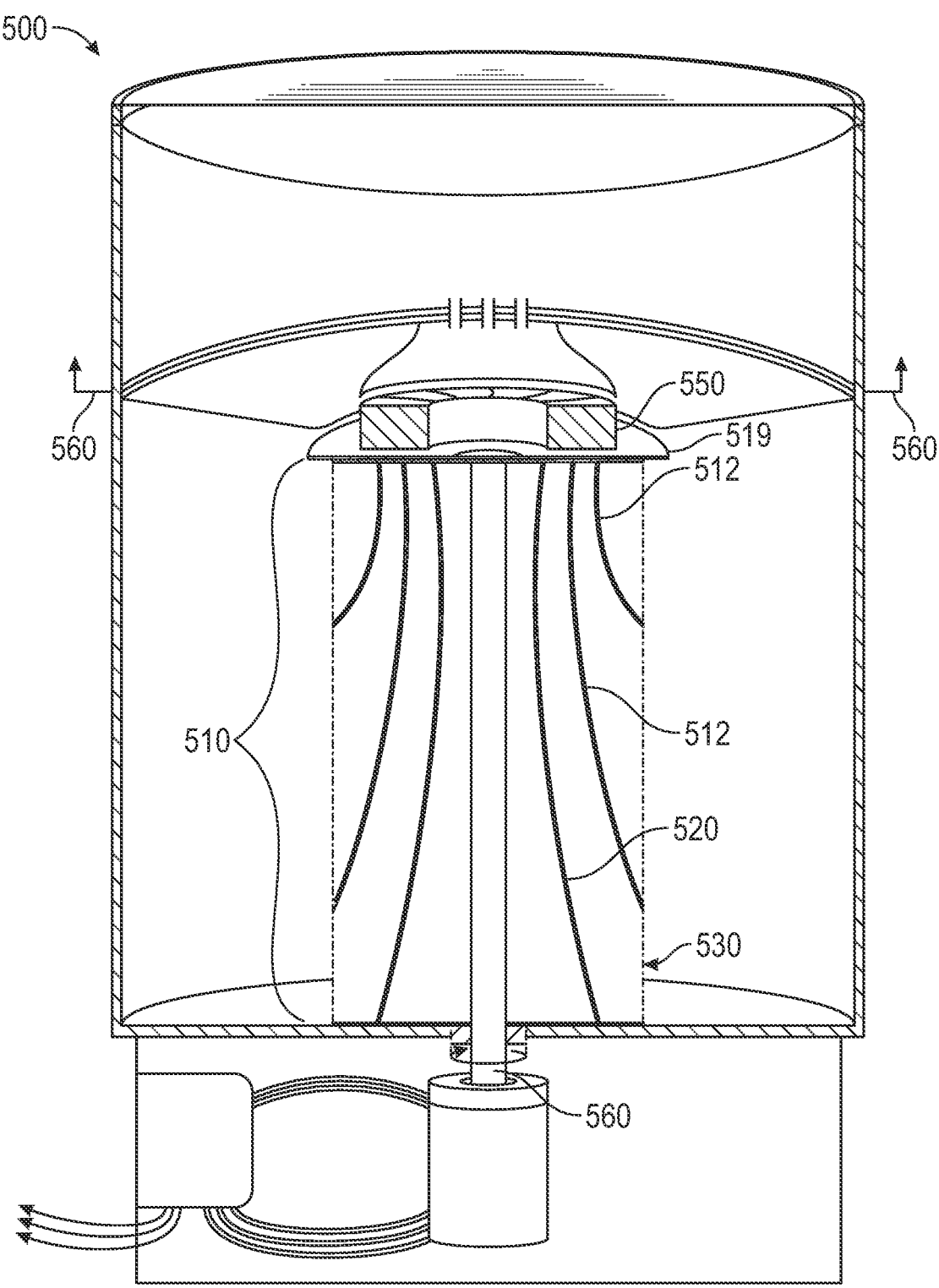
FIG. 5 is a simplified cross section of the entire multistage vertical axis wind turbine.

FIG. 5 (500) is a simplified cross section of the entire multistage vertical axis wind turbine. Specifically, the second stage of the multistage wind turbine is detailed in illustrating the second stage conical shaped stator assembly (510). Guided wind flow blades (512) surround the second stage conical shaped stator cone (520). The center cone portion of the conical shaped stator cone (520) provides the conical cylindrical shape. The wind flow blades (512) are adjacent to and surrounding the second stage conical shaped stator cone (520). Attachment is accomplished by a multiplicity of vertical support axis blades (530) (as shown in FIG. 2 and FIG. 3 as (215)) radially disposed around the conical shaped stator cone (520) as well as a top rotating support (519). The wind is guided from moving in a horizontal direction to a vertical direction by the use of the entire second stage conical shaped stator (510). In addition, the wind headed in the vertical direction drives the axial rotor (550). As the rotational shaft (560) that corresponds to (236) on FIG. 2 rotates, it is connected on the bottom of the multistage win turbine to provide power for energy conversion devices.

Figure 6:
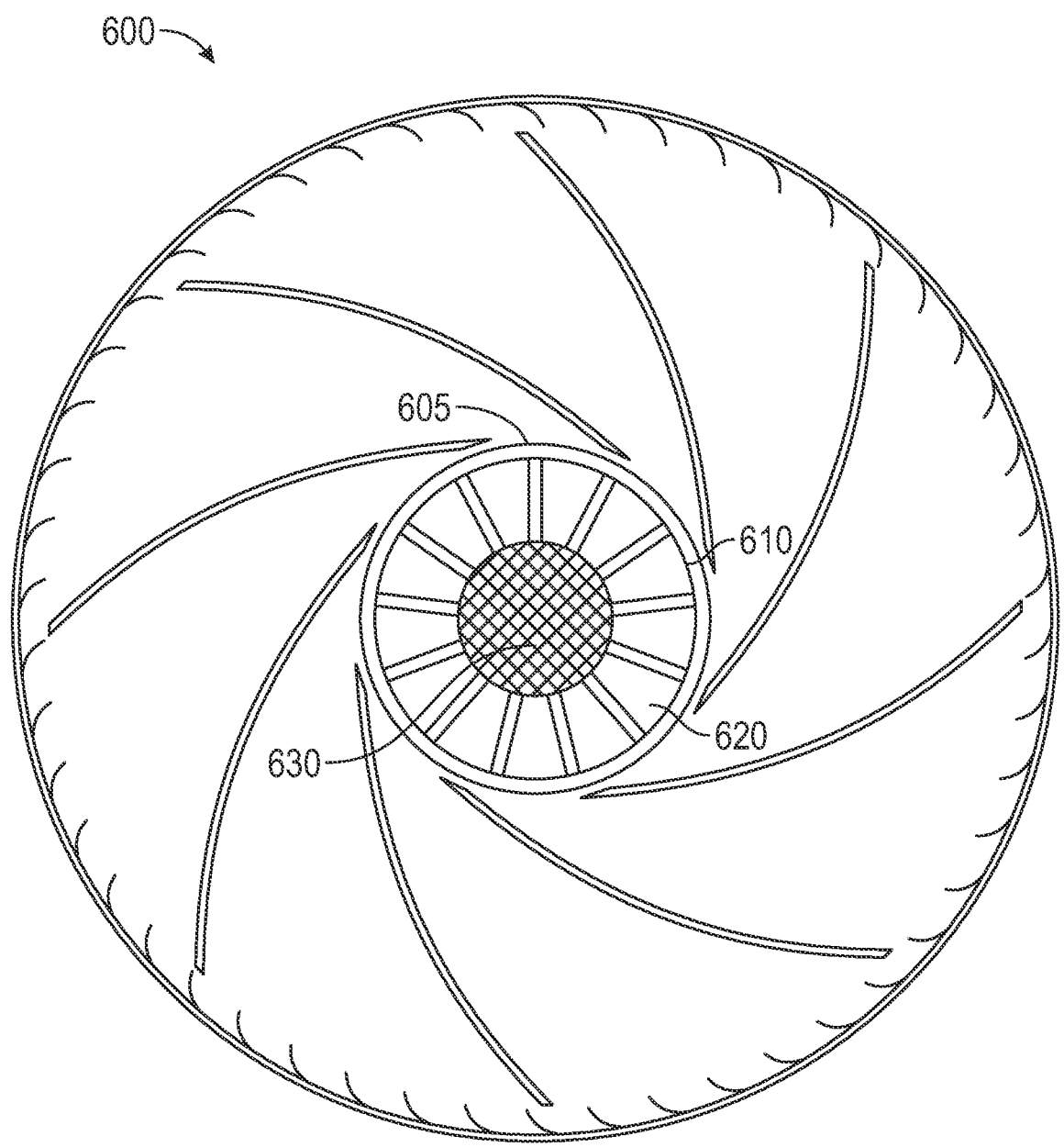
FIG. 6 represents a simplified composite cross section of the second stage axial rotor as it exists within the multistage wind turbine illustrating location and functionality

FIG. 6 (600) represents a simplified composite cross section of the second stage axial rotor (610) (shown as 550 in FIG. 5) as it exists within the multistage wind turbine to illustrate its location and functionality. Referring back to FIG. 5, the arrows (560) indicate a slice of the plane of the simplified composite cross section. The second stage axial rotor exists above and is attached to the first stage vertical rotor (605) which corresponds to (210) in FIG. 2. The second stage axial rotor (610)—shown in FIG. 2 as (220) is attached to the vertical axis rotor (210 in FIG. 2) so that the two rotors can rotate in tandem. The second stage rotor (610) also has a multiplicity of axial blades (620) corresponding to (225) in FIG. 2 with a top cover plate (227) which is now (630). As wind passes through the second stage stator (see FIG. 5) it is directed axially to the multiplicity of axial blades (620) which creates additional torque that translates into addition force that would not exist for single stage wind turbine designs.

Figure 7:
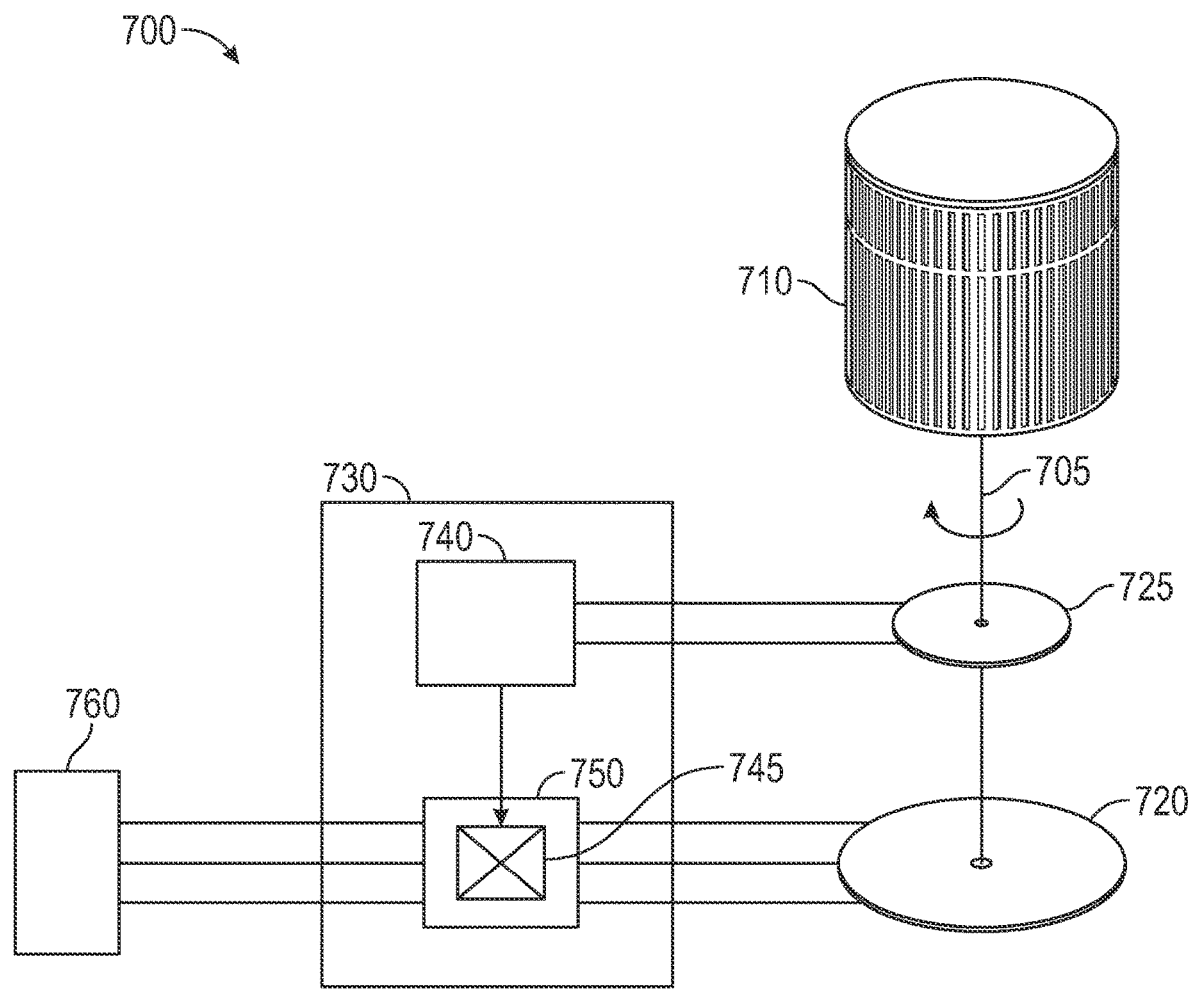
FIG. 7 is a schematic of the power system designed for the multistage wind turbine with a rotational shaft that drives an energy conversion device.

FIG. 7 (700) is schematic of the power system designed for the multistage wind turbine (710) with a rotational shaft (705) corresponding to (236) in FIG. 2, that drives an energy conversion device such as the generator (720) corresponding to (235) in FIG. 2. This power system (700) is designed to monitor the speed of the rotational shaft (705) using a tachometer (725) corresponding to (238) in FIG. 2, with a controller (730) that utilizes logic (740) and one or more valves (745) within a valve arrangement (750) to ensure that the energy converted from the rotational shaft (705) via the multistage wind turbine (710) is properly utilized. Here, as the multistage wind turbine is in use (710), the rotational shaft (705) turns at a speed measured by the tachometer (725) and also connected to the generator (720) and a controller (730) that controls an ability to convert kinetic mechanical energy from the rotational drive shaft that also is connected to the drive shaft of the generator (705) to an output energy load (760). In this fashion, the controller (730) also measures the rotational speed of the rotational drive shaft (705) and utilizes measurement of the rotational speed of the rotational drive shaft in order to control conversion of a desired amount of kinetic mechanical energy to load energy (760). The controller (730) utilizes logic (740) to also control the valve arrangement (750). The valve arrangement provides the ability to control energy flow from the rotational shaft (705) to a final energy load (760).

WORKING EXAMPLES

The general principle regarding the present disclosure is to provide a box-like structure around the multi-stage wind turbine that controls and guides the wind to optimize the turbine operation with inexpensive non-moving parts. The box-like structure resembles that of a large air conditioner. The device can keep animals and birds out of the single moving part, the rotating multi-stage wind turbine. The exterior box-like case is optionally a useful part of the wind gathering stationary blades. The stationary blades can be designed to reduce the wind intake when the wind increases over some limiting design velocity. The stationary blades can further bypass much of the wind from producing torque in the multi-stage wind turbine when the wind exceeds some limiting design velocity. The unit's design goals are to provide low-cost renewable energy in a simple and reliable package. The unit is designed for very quiet, light weight, easily installable, and roof mountable operation. The unit is very safe as the moving parts are totally enclosed. The unit does not need to be placed on any special mounting structure such as a pole or tower. One or more versions can be designed to be mounted around light poles with a hollow center.

Multi-Stage Wind Turbine Applications

The features of this multi-stage wind turbine are advantageous where moderate wind fields are present and direct use of produced power in a cost optimized, high reliability package is desirable. The small size and weight of one such device allows for portable and mobile applications. Roof mounting is possible, without adding additional structural support, since the device weight is less than for a typical roof mount air conditioner of the same or similar size.

Urban and suburban applications are excellent opportunities for employing the multistage wind turbines described. The selected rooftop locations experience rapid changes in wind direction because of the multiplicity of structures which block and channel the wind field. The multistage wind turbine is radially symmetric and can simultaneously utilizes wind from all radial directions. Rapid changes in wind direction are instantly fully utilized.

These devices are very quiet (designed to be less than 50 decibels during operation so that the units cannot be heard by a person or people at ground level) even during operation in high velocity wind. Quiet operation is very important for urban and suburban applications of wind energy. The designs presented are optimized to reduce blade tip velocity and blade turbulence, which are major contributors to noise, reduced efficiency, and damaging vibration in many other wind turbines. Cross-over turbulence is a major problem in many wind turbines, causing sub-sonic pressure waves that impact humans and wildlife. The multi-stage wind turbine does not produce any subsonic pressure waves.

The multistage turbines disclosed herein provide direct power at the point of installation. This allows point of use for all off grid applications without the need for towers typical of current horizontal wind turbines. The small roof mount footprint allows for the installation of multiple units on a roof with each unit operating independently for high power availability even if one or more units require maintenance.

Best of all, point of use applications save all the power grid transportation losses, that average 25% power loss from generator to user. The wind generated power from the exemplary device can be produced in phase with the grid for direct grid feed and direct attachment to the grid. This means the wind generated power can be a direct power offload of grid sourced power at the point of use.

Since these devices have few moving parts and are fabricated with rugged construction, they are suitable for remote locations such as desired for powering farm pumps and telecommunications power systems. These devices can be fabricated with materials suitable for marine and salt spray locations on ocean buoys, offshore platforms, lighthouses, and navigation power systems. Power supplies for remote sensors along pipelines, transmission lines, railroads, seismic, weather, navigation transmitters, radio repeaters, and security systems are all possible applications.

An example application is a flat roof warehouse for a shopping strip center building or set of buildings. Roof mounting along the parapet of roof, set back at least the length of a diameter dimension of the multi-stage wind turbine is optimal. In this location the wind is focus by the building structure itself since the wind is forced to pass over or around the building structure. Multistage wind turbines can be placed one to two diameter measurements apart along one side of the entire building perimeter with little impact on the neighboring units. A second row of multistage wind turbines can be placed one to two diameter measurements away from the parapet row in the gaps left by the first row. In this position the wind which is not fully utilized by the first row is used by the second row of multistage wind turbines. Further rows of multistage wind turbines are not beneficial without sufficiently large spacings. Each multi-stage wind turbine can be directly connected to the grid, potentially to existing roof mounted air conditioners with existing wiring. In all cases, the applicable electrical codes, standards, and load engineering must be followed. Similar considerations apply to tall buildings in cities.

Another example application is the use of the multistage turbines of the present disclosure for rural irrigation wells. One to three multistage wind turbines provide an optimal configuration for mounting and connection to the well pump. In some applications, it is possible to operate completely off grid as intermittent irrigation pumping may be satisfactory and a grid tie may be very expensive. The multistage wind turbine could be mechanically directly connected to the well pump (via a belt or chain) for a purely mechanical application. The multistage wind turbines may be roof mounted on the pump house or ground mounted. Ground mounting on a soil mound will optimize the velocity of the wind available to the multistage wind turbines. There is the same wind amplification effect, on the top of a soil mound, as the flat roof building mounting, described earlier. Off-grid applications may utilize standby power generation, and/or storage batteries.

Another very useful wind amplification technique for the multistage wind turbine is also described here. Simple walls can be constructed to direct a larger wind field to the multistage wind turbine. (The design of the venturi section of the multistage wind turbine is a direct application of expanding the wind field using barrier walls.) For example, a single multistage wind turbine could be utilized with a large wind field amplification factor to implement a very low cost, low-tech installation. This may be useful to power a small rural village. In this case, placing the multistage wind turbine on top of a natural or man-made earth mound would improve the wind field at the multi-stage turbine. Then simple earth walls are built radially from the multistage wind turbine to extend the wind field to encompass a much larger effective diameter. Three walls are the minimum while six walls are optimal. The wind focus is accomplished using the radial walls to direct and concentrate a larger wind field to the multistage wind turbine in the center. The wind focus increases the wind velocity of the large volume of wind entering and moving between the radial walls as the cross-sectional area between the walls reduces toward the center so that the multi-stage wind turbine at the center of the radial walls receives a large volume of wind with increased velocity. Wind expansion takes place as the exiting wind passes between the diverging radial walls. The radial walls direct a larger volume of wind energy, with an increased wind velocity, to power the multistage wind turbine so that the turbine of the present disclosure can supply more energy than conventional wind turbines with no radial walls.

A more detailed operational understanding is provided below:

Multistage Wind Turbine Operating Principle

An exemplary device consists of an exterior box-like case with interior blades (stator) which guide the wind to a smaller multistage wind turbine rotor at the center of the unit. The multistage wind turbine rotor converts wind energy to rotation and torque in the shaft. The shaft connects to a rotary power converter, typically an electric generator. The generator is connected to power output electric wires (the load) through a control "valve" that allows power to flow out of the generator when the generator is rotated by the wind forcefully enough to drive useful power to the load.

The multistage wind turbine rotor has a radial stage and an axial stage to extract an increased amount of potential energy from the wind traveling through the multistage wind turbine. Each stage is designed to extract a fraction of the potential energy available from the wind entering the exterior box-like case so that increased conversion to kinetic energy is viable. This is a similar methodology used in other high efficiency turbines such as steam turbine generators and jet engines. Each stage is designed to convert a fraction of the available power to torque at the common shaft. Multistage axial designs, such as jet engines, are well understood in the art and are commercially produced with high volume production.

An optional venturi section is arranged in the wind exit pathway from the multistage wind turbine rotor to assist wind exit into a low-pressure zone created by the venturi. Assisting the wind exit path provides for more power to be extracted from the wind by the multistage wind turbine.

Multistage Wind Turbine Multiple Stages

Another feature of the present design is the combination of a radial and an axial stage in a wind turbine. The use of a radial stage is quite common in vertical axis wind turbines. Both drag and lift rotor designs are available. Both designs exhibit problems resulting in low efficiencies. These are covered in more detail in the following section entitled "Multistage wind turbine power conversion efficiency." The multistage wind turbine has a first stage radial stator and rotor optimized for power conversion efficiency. Some potential energy and resulting power remains within the wind exiting the first stage rotor. A second stage in the multistage wind turbine is optimized to extract more energy from the wind exiting the first stage.

The second stage of the multistage wind turbine has a stator and a rotor. The stator is physically mounted inside the first stage turbine radial rotor. The second stage stator guides the wind, exiting the first stage rotor, from a radial direction to an axial direction. The second stage stator and rotor are designed to optimize potential energy and power extracted from the wind that exits from the first stage turbine. The axial portion of the multistage wind turbine further increases the overall turbine efficiency.

Additionally, the wind exits through an optional venturi section that creates a low air pressure exit path, which provides for actually accelerating the wind that exits the multistage wind turbine. This enhances the ability to achieve optimal turbine efficiency. Increased turbine efficiency extracts more potential energy from the wind entering the multistage wind turbine. Thus increased efficiency allows the multistage wind turbine to convert the increased potential energy to realize more kinetic energy resulting in the actual power extraction from the wind.

Multistage Wind Turbine for Low-Cost Power

The multistage wind turbine is designed for reduced cost, simple design, high reliability, and efficient operation. A guideline useful to accomplish these goals are the fact that "moving parts are more expensive and less reliable than non-moving parts." A single axis design was chosen to reduce the number of moving parts to a single part.

The wind focus here is employed in this case to dramatically decrease the size of the single moving part (the multistage wind turbine rotor.) The multistage wind turbine box-like case (stator) is used to gather, accelerate, and direct the wind entering the multistage wind turbine, using the wind focus between the converging stator blades, to be used most efficiently, while simultaneously reducing the cost of the entire device. The box-like case is made of stationary and inexpensive parts, in comparison to the more expensive rotating portion, that is the multistage wind turbine rotor. The box-like case provides a large functional increase in the operation and function of the multistage wind turbine rotor by gathering, accelerating, and directing the wind to the multistage wind turbine rotor for the most efficient operation of the rotor in converting potential wind energy to kinetic energy at the shaft.

The increased wind velocity at the rotor starts generating power when lower wind conditions exist. With increasing wind speed, the multistage wind turbine quickly reaches maximum power generation capability.

Once maximum power is reached, the multistage wind turbine is also designed to start shedding excess wind power to protect the generator and electronics from any over speed resulting in over power generation scenarios. This shedding of excess wind power is partly accomplished through the design of the box-like case, as explained in detail in the section "Multi-stage wind turbine wind Overspeed limiting." The key point here is the box-like case serves multiple operational functions of the multistage wind turbine with stationary, less expensive, parts.

Multi-Stage Wind Turbine Safe Operation

The multi-stage wind turbine is a very safe device. The moving parts are totally enclosed within the box-like case. The box-like case keeps birds and animals out of the unit. The single moving part (multi-stage rotor) is housed deeply inside the device and surrounded with the first stage stator blades and top cover (and optional venturi exhaust.) The rotor is designed for low noise using a low revolution rate and low tip speed rotor blades. The unit is designed for ground or roof mounting without a pole or tower. The device operates quietly. These are all favorable for safe operation in urban, suburban, rural, mobile and marine applications.

Standard wind turbines generally do not have these features. Large commercial horizontal turbines are not suitable near people due to the sub-sonic turbulence they produce. Almost all horizontal wind turbine designs require a tower which is not suitable in many locations. The rotor blades have high tip speed which is noisy and dangerous. Bird kills are an ongoing problem that has not been solved to date. Any hub or blade mechanical failure result in unsafe operation and potential local damage.

Vertical axis wind turbines have fewer safety problems. Some designs have high tip speed rotors with their inherent problems noted above. Vertical axis wind turbines generally produce less noise. Some designs have a noisy blade thump as the blades stall during part of the rotation. Blade failures can still be quite dangerous. The exposed blades still need to be fenced off or elevated for safety. Vertical axis wind turbines are more suitable for urban and suburban locations than horizontal wind turbines.

The multi-stage wind turbine is the best choice for safe operation.

Multi-Stage Wind Turbine Point of Use Power Generation

Point of use applications do not have power grid transportation losses. These average 25% power loss from generator to user. The wind generated power from the exemplary device can be produced directly in phase with the grid for direct grid feed and direct attachment to the grid. This means the wind generated power can be a direct power offload of grid sourced power at the point of use. The best economy of power production versus cost is direct power offload of grid sourced power since no power backup or storage is included. This is the first choice when pure economy of power produced versus cost is the motivation to install multi-stage wind turbines.

The multi-stage wind turbine is configurable to operate with power storage systems. These installations are typically optimized to retain as much power locally as possible. Peak load limiting is a favorable economic model for this class of power systems. Similar in concept to a hybrid vehicle, peak load limiting stores power locally in the facility. The stored power is utilized during peak demand to reduce the peak load pulled from the power grid. Industrial and commercial power meters measure the peak power drawn from the power grid. The power supply company applies the peak load, as a multiplier, according to the supply contract tariff rates. Reducing the peak load reduces the entire power bill by the reduction in the peak load multiplier.

Another favorable application for local power storage is differential power metering. In this case there are two power rates, one for power drawn from the grid, and a lower rate for power supplied back to the grid. These applications attempt to lower power the power bill by storing excess wind energy produced locally instead of selling this excess wind energy back to the power grid at the lower power rate. There are multiple qualifiers to build an economic case for storage versus differential power metering rates. The biggest qualifier is the amount of excess wind power produced. For many applications, the locally produced wind power rarely exceeds the power used from the power grid. These applications make no sense for a differential power metering economics.

The third case for local power storage is emergency power upon grid failure. This is actually an independent economic case for short term emergency power which has nothing to do with wind supplied power. The local power storage is purely for facility emergency operations leading to a controlled shutdown. There is an important caveat, that is discussed in the desire for off grid power.

Off grid power is highly desirable by many customers and for many different reasons. The multi-stage wind turbine can be used off grid power applications even in urban or suburban applications. Two classes of off grid power exist: (a) No grid connection. (b) Grid connected as a backup for local power generation.

In case (a) the no grid connection case, power must be generated locally for the application. These are typically rural, remote, and mobile applications. Suitable power storage is required to keep the application operating during extended durations of insufficient power availability from the generating source. For intermittent power sources such as wind and solar, excess generating capacity is installed, and power storage is included to keep the application operating to some calculated level of operational reliability. In the case of a very long gap in the generated power, the application will stop operating. Wind is available in most locations for some time each day. Solar is generally available each day except near the Earth poles where length of time and amount of sunshine is a seasonal event. Wind and solar typically complement each other as wind is available during extended storms, while solar is more available during long summer calm weather periods.

In case (b) Grid connected as a backup for local power generation, the reason for off grid operation is likely not an economic choice. The requirements are the same as for the no grid available case above, except storage requirements can be reduced to any acceptable points when backup power from the grid is required. This case is really an extension of the differential metering case discussed earlier.

Four caveats: (a) The grid connection will cost some base amount simply for the service cost. (b) Tariff regulations may require some power to be metered either way, from the grid or to the grid, to retain the grid connection. (c) There may be large tariff penalties to actually disconnect permanently from the grid. (d) Since the wind is generating more power than the application requires, it is beneficial to sell the excess power back to the grid, and good for the environment.

The multi-stage wind turbine is configurable to operate with all of the aforementioned power storage systems.

Multi-Stage Wind Turbine Power Conversion Efficiency

The exterior box-like case along with the interior blades (stator) provides another high value function which is not obvious; that is efficiency. The stator directs the entering wind to only a portion of the multi-stage wind turbine rotor, while blocking the wind from the remainder of multi-stage wind turbine rotor. The portion of the multi-stage wind turbine rotor, to which the wind is directed, produces torque in the rotor. This is due to the interaction of the wind and the rotor. The portion of the multi-stage wind turbine rotor, from which the wind is blocked, is free to rotate unimpeded by the wind. The stator design of the multi-stage wind turbine provides completely different operation than standard vertical axis wind turbines. Standard vertical axis wind turbines of the drag blade design have a very difficult inherent problem. The wind impacts the entire set of rotor blades. On one side of the axis, the rotor blades are being dragged down wind and impart torque in the axis shaft. On the other side of the axis, the rotor blades return upwind. The wind drags against the upwind traveling blades and actually produces anti-torque in the axis shaft. Anti-torque is torque in the opposite direction than the rotor is designed to turn. This anti-torque is the major contributor to the low power conversion efficiency of drag blade vertical axis wind turbines. Maximum theoretical efficiency is only 15% for a wind drag turbine.

The stator design in the multi-stage wind turbine eliminates the anti-torque in the rotor blades on the upwind portion of travel. The torque imparted by the wind to the rotor is fully available to be converted into output power from the multi-stage wind turbine. The portion of the multi-stage wind turbine rotor, from which the wind is blocked, is free to rotate unimpeded by the wind. There is no anti-torque in multi-stage wind turbine. Rotor torque and power conversion efficiency are greatly increased.

Additionally, the wind is optimally directed into the multi-stage wind turbine, which further increases turbine efficiency. This is covered in the section "Multi-stage wind turbine wind gathering stator." And the multi-stage wind turbine has a second stage turbine designed to extract even more power from the wind. This is covered in the section "Multi-stage wind turbine second stage turbine."

Multi-Stage Wind Turbine Wind Overspeed Limiting

Overspeed in high winds is a big problem for wind turbines. High velocity winds result in high turbine rotation speed. Axis bearings are stressed. Centripetal force stresses the turbine blades and supports. Any imbalance in the rotating parts is magnified at higher rotation rates. Typical wind turbines have various means of limiting overspeed. These generally require added complexity as brakes or blade feathering mechanisms. The multi-stage wind turbine has a completely passive means of limiting much of the effects resulting from high velocity winds.

As explained in the section "Multistage wind turbine for low-cost power" the multi-stage turbine uses wind focus in the box-like case to reduce cost, increase efficiency, and protect from high speed wind conditions. Once maximum power is reached, the multistage wind turbine is also designed to start shedding excess wind power to protect the generator and electronics from any over speed resulting in over power generation scenarios.

Wind focus is a two way street. The wind entering the stator blades is slowly constricted and increases in velocity. There is also back pressure developed at the wind inlet. The back pressure at the wind inlet is mostly the result of the work being done by the wind interacting with the rotor to produce torque and turn the shaft.

The back pressure developed at the wind inlet of the multi-stage wind turbine is utilized to self-limit the wind velocity at the multi-stage wind turbine rotor. In other words, as more power is generated, there is more back pressure reflected to the stator inlet. The more back pressure at the stator inlet, the less wind can actually enter the stator because the inlet wind has only a specific amount of impact pressure developed according to the wind velocity. What happens to the excess wind that cannot be utilized by the multi-stage wind turbine? The excess wind simply diverts its path and blows around the multi-stage wind turbine. This self-limiting wind velocity effect is an important feature of the multi-axis wind turbine. In high wind velocity conditions, such as storms, excess wind will simply divert around the multi-stage wind turbine. Since it is inherent in the mechanical design of the multi-stage wind turbine itself, the rotor is protected from overspeed conditions. It is reasonable to design a four-times (4X) increase in wind velocity from the box-like case to the multi-stage wind turbine rotor. The multi-stage wind turbine stator will allow the multi-stage wind turbine to operate effectively in both low wind velocity through the wind focus, and in high wind velocity through the self-limiting back pressure developed by the multi-stage wind turbine rotor.

Multi-Stage Wind Turbine First Stage Turbine

The multi-stage wind turbine has a first stage radial stator and rotor optimized for power conversion efficiency. The design is optimized to reduce blade tip velocity and blade turbulence, The moving parts are totally enclosed within the box-like case. The box-like case keeps birds and animals out of the unit. The box-like case has wind inlets designed with a slight angle to start turning the entering wind in the direction of rotation of the multi-stage wind turbine rotor. The single moving part (multi-stage rotor) is housed deeply inside the device and surrounded with the first stage stator blades.

The multi-stage rotor is designed for low noise using a low revolution rate and low tip speed rotor blades. The multi-stage rotor has both the first stage radial rotor and the second stage axial rotor integrally attached together and to the shaft. Since the two rotor stages turn on a common shaft, the blade design and pitch of each rotor stage must operate in tandem extracting maximum power from the wind.

The first stage turbine is radially symmetric to utilize wind from any radial direction, even simultaneously. The first stage turbine matches the stator wind focus velocity acceleration and angle of attack into the rotor with the rotor blade design. The blade counts are both odd numbers and preferably primes to minimize wind impact pulsations which generate noise. The blades are slightly tilted to further smooth the wind impact transition as the blades cross.

The first stage turbine stator and rotor have similarity with a centrifugal blower used in reverse to extract power from the wind stream. The stator directs the entering wind to only a portion of the first stage turbine rotor, while blocking the wind from the remainder of first stage turbine rotor. The portion of the first stage turbine rotor, to which the wind is directed, produces torque in the rotor. This is due to the interaction of the wind with the rotor. The portion of the first stage turbine rotor, from which the wind is blocked, is free to rotate unimpeded. The stator design in the first stage turbine eliminates any anti-torque in the rotor blades. The torque imparted by the wind to the rotor is fully available to be converted into output power from the first stage turbine.

Multi-Stage Wind Turbine Wind Gathering Stator

The exterior box-like case along with the interior blades (stator) is radially symmetrical, which retains the ability to gather wind from all radial directions, just as a standard vertical axis wind turbine. There is no need for a secondary yaw mechanism as is necessary in horizontal wind turbines. There is only one moving part required, that is the multi-stage wind turbine rotor and associated generator.

The area of the box-like case which is facing the wind is the current stator inlet. Wind enters the inlet through the slots in the box-like case. These slots are slightly angled and change the wind direction slightly in the direction of the turbine rotation. The wind then travels between the stator blades, which converge toward the center of the stator. The wind volume traveling between the converging stator blades increases in velocity because of wind focus. The wind energy is focused by the converging stator blades. This increased velocity wind is directed to the multi-stage wind turbine rotor in the center of the boxlike case. The increased velocity wind drives the multi-stage wind turbine rotor to produce as much or more power than a standard vertical axis wind turbine of the same diameter as the box-like case. The combination of the multistage stator and rotor are more efficient at wind energy conversion than a standard vertical axis wind turbine rotor with no stator.

The multistage wind turbine stator can be optimized for gathering wind and directing the wind at the best angle of attack toward the multi-stage wind turbine rotor. The multistage wind turbine rotor design is optimized to utilize the wind from the stator with a specific entry angle of attack.

Wind speed increase using wind focus is closely proportional to the ratio of the diameters of the box-like enclosure (stator) and the multi-stage wind turbine rotor. In one instance, a 2 meter box-like enclosure with a ½ m interior turbine rotor provides ratio that is four times the area from the outside wind inlets to the interior turbine rotor wind inlets. This four to one area ratio receives wind volume through 4 units of inlet cross-sectional area to the stator and funnels this wind volume to one unit of exit cross-sectional area to the turbine rotor. In this instance the wind velocity increases four times as the wind travels through the four to one area ratio funnel. The result, in this instance, is a wind velocity that at one meter per second (1 m/s) entering the four to one area ratio funnel would increase to four meters per second (4 m/s) at the exit of the funnel.

At some point the wind velocity increase will no longer be proportional to the ratio of the box-like enclosure and the multi-stage wind turbine rotor diameter. Wind focus is not a linear formula. As the wind velocity increases in the stator through the reduction in cross-sectional area, there is also a reverse effect of pressure increase at the inlet. This pressure increase at the inlet reduces the wind volume entering the inlet. The amount of back pressure developed at the stator inlet is also proportional to the amount of pressure at the outlet of the stator. The amount of pressure at the outlet of the stator is also proportional to the amount of torque generated as the wind enters the multi-stage rotor and transfers the wind potential energy into kinetic energy in the shaft. The development of torque in the multi-stage rotor, the rotor efficiency, and the rotational speed of the rotor all contribute to the amount of resultant pressure at the stator inlet.

The first stage turbine stator is designed to maximally utilize the first stage rotor to convert wind energy to shaft power. The stator directs the entering wind to only a portion of the first stage turbine rotor to produce torque in the rotor. The stator blocks the wind from the remainder of the first stage turbine rotor which is then free to rotate unimpeded and does not produce any anti-torque as is normal in standard vertical axis wind turbines. The torque imparted by the wind to the rotor is fully available to be converted into output power from the first stage turbine.

Multistage Wind Turbine First Stage Rotor

The multistage rotor has both a first stage radial rotor and a second stage axial rotor, integrally attached together, and to the shaft. Since the two rotor stages turn on a common shaft, the blade design and pitch of each rotor stage must operate in tandem extracting maximum power from the wind. This section only applies to the first stage rotor.

There are many choices possible for the blade design of the first stage rotor. The section of this disclosure entitled "Multi-stage wind turbine power conversion efficiency" explained how the design of the first stage stator makes efficient use of the first stage rotor by eliminating anti-torque. The first stage rotor is specifically designed to operate within the first stage stator, and the stator/rotor are designed as a unit for this application.

Following is a short explanation regarding open air drag blades as used in standard vertical axis wind turbines as background to better understand the first stage rotor design of the present disclosure including that of the multistage turbine:

A drag turbine in free air is generally considered to have a maximum efficiency of 15 percent. That is 15% of the wind energy can be converted into torque at the drag turbine driveshaft. The reason the efficiency is relatively low is because with the drag turbine the wind pushes the blades down-wind only on one side of the drive shaft. When the blades are fully in the downwind position, they neither push nor restrict the movement of the turbine driveshaft. As the blades continue their rotation on the turbine drive shaft they must return against the wind on the opposite side of the drive shaft. Thus with flat paddle drag blades there is actually no net torque and the turbine will not spin.

For drag blade turbines to spin and produce net torque there must be some curvature in the drag blades. This curvature is typically seen in cup type anemometers. The cups are pushed downwind on one side of the drive shaft. On the opposite side of the drive shaft the cups must return against the wind. Since the cups have a rounded face toward the wind they have less friction against the wind when returning upwind. The cup type drag turbine produces torque from the difference in the wind drag of the dished side of the cup to the rounded side of the cup.

In present design, the first stage rotor is not a simple curved drag blade design. The first stage turbine stator and rotor are similar in design to a centrifugal blower used in reverse to extract power from the wind stream. The first stage rotor is actually designed with multiple features that:

(a) convert the wind into shaft power (b) feed the remaining, unconverted wind optimally into the second stage wind turbine and (c) handle overload bypass for high wind conditions.

The first stage rotor of one of the exampled designs utilizes radial blades which are set with a small angle towards the interior in the direction of the rotation of the rotor. These radial blades are paired with the first stage stator that routes the wind into the rotor tangentially. This provides for accomplishing all three design objectives.

The radial flat blades are used directly as drag blades driven with tangentially focused wind from the stator. Maximum impact drag creates maximum torque at the full wind velocity exiting the stator. The slight angle of the rotor blades maximizes the wind impact along the curved travel of the rotor. The overlapping first stage stator confines the wind to only travel towards the inside of the rotor.

The remaining wind velocity is directed towards the interior of the rotor by the angle of the rotor blades. Since the interior of the rotor blades leads towards the direction of rotation, all wind traveling faster than the rotor is guided inwards. This is also favorable to provide reduced wind turbulence along the rotor blade edges. Thus, the excess wind velocity is directed into the second stage turbine.

Overload bypass is accomplished by the same feature of the rotor blades guiding excess wind velocity into the second stage turbine. The wind bypass feature reduces stalling and turbulence in the first stage rotor during high wind conditions. The excess wind velocity is then simply pushed along into the second stage turbine.

Airfoil shaped first stage rotor blades are a potential future option that can be implemented as needed. These airfoil designs would further increase the efficiency of the rotor.

Multi-Stage Wind Turbine Second Stage Turbine

The second stage turbine is a hybrid design with the stator inside the first stage rotor, and the second stage rotor mechanically attached to the first stage rotor. The second stage turbine converts wind velocity remaining after the first stage into additional shaft power. The first stage turbine is between thirty and forty percent efficient. Much more power can be converted from the potential and resulting kinetic wind energy using the second stage.

Mechanically, the second stage guides the wind exiting the first stage from a radial flow to an axial flow. The wind exiting the first stage provides a strong rotating velocity component in part due to the fact that the wind entered the first stage tangentially. The second stage also straightens the rotating velocity component to provide a controlled axial wind flow to the second stage axial rotor. Controlling the wind flow direction is necessary to maximize the power extraction in the second stage turbine.

The second stage turbine design is complex. There are the mechanical constraints of placing the second stage stator inside the first stage rotor. The second stage rotor must operate at the same rotation rate as the first stage rotor since they are physically connected to a common shaft. Wind velocity is reduced because power was extracted in the first stage turbine. So, the second stage stator/rotor combination requires complex designs with design constraints to extract additional wind energy.

Multistage Wind Turbine Second Stage Stator

In yet another working example, the second stage stator is located inside the first stage rotor. The second stage rotor is both a wind direction guide and conventional axial stator. The second stage stator is attached to the bottom of the box-like case.

The first function of the second stage stator is to guide the wind exiting the first stage turbine rotor from a radial flow to an axial flow. A generally conic section in the center of the second stage stator guides the wind flow from being captured radially inwards to being provided vertically upwards. The conic section is optimized, within the space constraints, to change the wind direction smoothly. The smooth direction transition is designed to minimize turbulence in the wind so that potential and eventual kinetic energy is not lost during the wind direction change.

Optimizing the wind direction change is accomplished using well documented air ductwork methodologies. The conic section utilizes a curved profile. Additional conic vanes with curved profiles assist in the smooth change of wind direction. The change in cross-sectional area of the wind flow area in the second stage stator is also part of the design.

The physical location of the second stage stator has a limited cross-sectional area because it is restricted to the interior of the first stage turbine. Using wind focus, the reduced cross section for the wind flow will increase the wind velocity. This velocity recovery is useful and allows the second stage stator to accelerate the wind into the second stage rotor for eventual increased power conversion.

The second function of the second stage stator is as a conventional axial stator. Axial stator design is well understood in the art. For this design, the wind exiting the first stage has a strong rotating velocity component, because it enters the first stage tangentially. Because the first stage rotor operates with rotational speed, the wind exiting the second stage rotor also has a strong rotational component. Conserving and adjusting the rotational component of the wind from the first stage is useful for the second function of the second stage stator—as it operates as a conventional axial stator.

A conventional axial stator imparts a specific rotating axial wind angle of attack to drive the rotor. The second stage stator operates in this exact manner by utilizing the existing rotational component of the wind. The second stage stator includes axial stator blades designed to match the second stage turbine rotor. These blades are curved aerofoils that are found in conventional axial stator designs. The curvature of the aerofoils is designed to take into account the existing rotational component of the wind as conserved within the second stage stator. This is in order to maximize power extraction from the second stage turbine.

Multistage Wind Turbine Second Stage Rotor

For one of the designs of the multistage turbine of the present disclosure, the second stage rotor is integrally attached to the first stage rotor. Both rotors operate at the same rotational speed and are attached the single shaft. The function of the second stage rotor is to extract additional power from the potential energy of the wind exiting the first stage turbine. The second stage rotor is a conventional axial design. The second stage rotor is specifically designed to work with the second stage stator as a unit (the second stage turbine).

It is common in conventional axial turbine designs for the turbine blades to be arranged in a ring with a solid center support. The majority of the dynamic energy is converted at the blade ends and tips into power. The ring design of the present embodiment is stronger. The smaller aerofoil section has improved aerodynamics over conventional designs. The present design described is common for both high performance axial turbines and even for simple computer fans. The second stage turbine rotor is a ring design rotor.

Multistage Wind Turbine Additional Turbine Stages

The multistage turbine of the present disclosure is not limited to two turbine stages. Additional turbine stages can be easily added after the second stage (axial) turbine. The purpose of the use of more axial turbine stages is to increase power conversion of the existing/remaining wind passing through the multistage wind turbine. The cost versus benefit ratio of additional turbine stages to determine the need for additional turbine stages is a key limiting factor.

One direct benefit of additional turbine stages is that they provide a purely mechanical addition to the multistage turbine. The shaft, power conversion section, and optional venturi remain unchanged. The need for these additional components must be weighed against the opportunity to simply install a larger version of the existing two turbine design. Another option is to simply install more multistage wind turbines. Another benefit of multiple multistage wind turbines is the increased reliability of the network of multistage wind turbines vs that of single stage larger wind turbines The value of increased wind turbine efficiency is also application driven. For instance, mobile applications may have a weight or physical space limitation. Limited roof mounting space is another consideration. Service and lighting pole mounting are another limiting factor. These, and other, limiting factors may lead to a determination that adding more turbine stages to increase the single unit turbine efficiency is advantageous.

Multistage Wind Turbine Venturi Wind Exit

The optional venturi wind exit unit provides a low pressure exit for the wind leaving the multistage wind turbine. The Venturi effect herein described is simply to provide locally increased fluid velocity that reduces the local fluid pressure.

The most common venturi exit is the use of the common chimney flue and stack design. A low pressure zone is created in the flue constriction which draws the smoke out of the chimney and out through the stack. The venturi exit of one of the presently described devices uses the wind passing over the top of the multistage wind turbine to draw the exiting wind out. A provided venturi exit addition is useful in the multistage turbine because of the high efficiency of the multistage wind turbine.

As the wind travels through the multistage turbine potential energy is removed from the wind and converted kinetic energy into the shaft resulting in power generation. The potential energy in the wind is actually the moving mass of the air. The formula for the resulting Kinetic Energy is $$KE = \tfrac{1}{2} m v^2$$

where;
m is the mass of the air
v is the velocity of the air
the 2 is the power of 2, or squared The wind (moving air) is the energy input. Converting potential energy from the wind into kinetic energy happens as the wind imparts force to the turbine rotor that creates shaft torque and rotation. The wind velocity slows leaving the turbine rotor by the amount of potential energy that was converted into kinetic energy.

The venturi exit design feature assists the air in the form of wind which has been slowed inside the wind turbine to exit more rapidly. If the wind did not exit the wind turbine, no more wind could enter the wind turbine. The wind turbine would stop. The wind must exit the wind turbine to allow more wind to enter the wind turbine. In other words, increasing wind conversion efficiency is a self-limiting process. If the wind turbine could be 100% efficient it would stop because the wind would have no energy to exit the wind turbine. The venturi devices portion of the multistage wind turbine with the exit design feature assists the slowed wind to exit the wind turbine.

The venturi device is designed to be radially symmetric so that it can provide the ability to speed the diverted wind equally no matter what radial direction from which the wind may enter. Radial vanes guide the wind toward the center of venturi, then back out the opposite side of the venturi. This creates a venturi low pressure zone in the center. As the wind velocity increases, due to the wind focus, through the reduced cross-sectional area, the pressure is also reduced. This locally created low pressure area is provided at the exit portion of the multistage wind turbine.

Additional wind flow restriction(s) through the venturi section are available from the curved upper and lower plates of the venturi section. These further enhance the low pressure zone to further help remove the exiting wind from the multistage wind turbine.

Multistage Wind Turbine Power Converter Generator

Included herewithin is power generation machinery and controllers to convert the torque and rotation of the turbine(s) into some other form of energy. Electrical generation is one option. Other forms of power output include compressed hydraulic fluids, compressed air, and mechanical gearing to drive other machinery.

Compressed hydraulic fluid and compressed air are useful options to both store and deliver useful energy which can be converted into work or power to operate one or more devices. A compressor can be connected to the power generation turbines to deliver compressed fluid or air to accumulators. The compressed fluids can then be used at any time to accomplish useful work. Utilizing a compressor for the power output machine can provide a self-regulating feature for the power generation turbine. The higher the output pressure stored in the accumulators the more torque load would be placed on the power generation turbine, and the slower it would turn. This would accomplish overspeed regulation of the power output turbine.

For electrical power generation there are a large variety of options and power storage devices. One embodiment includes a direct connection to an electric power grid with no storage devices and no conversion devices. This is the lowest cost connection to use the power generated from the device. Electricity is simply generated and delivered directly to the electric grid through the building power panel. Some internal controls are necessary to connect the power generation turbine to the electrical grid only when power is being generated. The power generation turbine must be disconnected from the electric power grid when there is insufficient wind to generate power.

Utilizing an alternating current induction electric motor as a power generator has some major benefits when delivering power to an electric grid. The generated power is always in phase with the power grid since the power grid energizes the magnetic coils in the motor. The electric motor then acts as a generator when the motor shaft is turned faster than the motor zero load speed. For a 60 Hz electric system and a two-pole electric motor this is 3600 RPM. (60 cycles per second for 60 seconds is 3600 revolutions per second). A two pole motor spins one revolution per cycle of alternating electric current.)

Estimated rotation speed of the power generation turbine at minimum "cut in" wind speed will be less than 3600 RPM. Thus, there needs to be shaft speed translation. On way is to increase the power generation turbine shaft speed with gears, pulleys, belts, chains etc. The other technique involves the use of an electric motor with more poles. Each pole pair reduces the angle of mechanical rotation of the electric motor to some fraction of a revolution. For instance, a twelve pole motor has six pole pairs, thus requires six electrical cycles to turn one revolution. A twelve pole motor turns 600 RPM at 60 Hz. A 24 pole motor turns 300 RPM at 60 Hz. And so forth.

Another desirable feature of utilizing an AC induction motor as a generator to directly connect to the grid is the load curve of the motor. As the motor shaft is spun faster than nominal line speed (as explained above) the motor generates electric power directly in phase into the electric grid. The faster the motor shaft is spun, the more electric is fed to the power grid. As more power is fed to the power grid, there is more torque load on the motor shaft (because power is being produced), thus the harder it is to spin the motor shaft. This places a torque load on the power generation turbine so it cannot speed up easily. The higher the wind speed, the more torque is driven to the motor shaft, the motor spins a little faster, the more power is fed to the electric grid, which further resists the rotation of the turbine. The system is self-regulating and self-limiting, assuming proper selection of electric motor (generator) to the power generating turbine.

Since the system is generally self-regulating and self-limiting, the electrical control system involves a rather simple design. In the case of using an AC induction motor as the generator, the electric controls need only validate a few measurements to connect the wind generator to the grid when there is enough wind to generate power to the grid. The most simple control system is a generating tachometer and an electrical contactor. The tachometer measures the generator shaft speed and energizes the electrical contactor when the generator is above some minimum speed. When the contactor has been energized, the motor is electrically connected to the power grid. The generator will slow down because it is now generating power into the power grid which places a torque load on the power generating turbine. The contactor provides some differences between the "pull in" and the "hold on" to actuate. This is known as hysteresis. It takes more to "pull in" and establish the electrical contacts than is required to "hold on" the electrical contacts. Thus, the generator can slow down a little bit and still "hold on" the connection to generate power to the grid. If the wind speed drops below some minimum (as measured by the tachometer measurement of the generator shaft speed), the contactor will not have enough power from the tachometer to "hold on" and will disconnect the generator from the power grid.

Some control systems may also require safety interlocks to not allow the wind generator to connect to the power grid unless the power grid is fully functional. This is normally validated through measurements of the power grid voltage and power line frequency. These can be included in the control system as added safeguards.

Multi-Stage Wind Turbine Cost Effectiveness

One must also consider increased efficiency from the perspective of how much larger a less efficient wind turbine must be to produce the amount of power as the more efficient and smaller multistage wind turbines. The conventional approach equates to a standard wind turbine of much larger dimensions than the more efficient multistage wind turbine required to produce the same amount of power. For example, a multistage wind turbine with two times the efficiency of a conventional design would produce the same amount of power as a conventional wind turbine of double the physical size (swept area). Surprisingly, doubling the swept area of a vertical axis wind turbine of the same height as the multistage wind turbine requires four times the amount of materials for construction (the area of the circle swept by the machine). Thus, the increased efficiency of the multistage wind turbine equates to tremendous capital cost savings with respect to material costs when compared to other wind turbines capable of the same power output.

The most expensive part of any device always involves moving parts. Moving parts are more expensive and less reliable than stationary parts. The multi-axis wind turbine of the present disclosure is optimized to use only one moving part. Vertical axis wind turbines inherently have a cost and reliability advantage versus horizontal wind turbines, which require a second yaw axis. The multi-axis wind turbine requires only a single axis just as other vertical axis wind turbines. The exterior box-like case along with the interior blades (stator) provides the same performance as a physically larger standard vertical axis wind turbine because the multistage wind turbine efficiency is higher, as described above. Further, a much smaller multi-axis turbine rotor is required for the same performance as a physically larger standard wind turbine. Because the multi-axis turbine rotor is smaller, it is less expensive. Thus, the most expensive part of the multi-axis wind turbine is less expensive, and the cost of the multi-axis design is lower cost per amount of generating capacity. The cost per kilowatt of generated power is optimized in the multi-stage wind turbine.

In another specific embodiment, the generator produces the maximum power over the largest range of wind speeds at any particular location. Once the multistage wind turbine unit is producing full rated power there is no advantage in having higher efficiency design components. A major design criterion for this multistage wind turbine is to provide very low cost per kilowatt-hour. One major design hurdle provided herein describes how to achieve the most reasonable, lowest installation cost that results in the highest output power delivered to the user. Here, another way of measuring efficiency is by designing for not only the operational costs, but also the most efficient use of capital costs required to generate the largest amount of consumable power.

I claim:

1. One or more multistage wind turbines comprising;
a first stage portion with a first static stator and a vertical axis dynamic rotor that has vertical axis turbine blades mechanically connected to one or more rotational drive shafts that rotate said one or more rotational drive shafts in either a clockwise or counterclockwise direction and a second stage portion with a stationary conical portion and a second vertical axis dynamic rotor that includes second rotor axial turbine blades mechanically connected to said one or more rotational drive shafts, wherein said first stage portion utilizes airflow that continues into said vertical axis wind turbine blades from wind sources to provide torque that overcomes an inertial static force of said one or more rotational drive shafts so that said vertical axis turbine blades cause rotation of said one or more rotational drive shafts and wherein wind continues past said vertical axis turbine blades through said conical portion, which is contained within said vertical axis dynamic rotor, and toward said second rotor axial turbine blades wherein said one or more rotational drive shafts provides energy to at least one energy conversion device.

2. The multistage one or more wind turbines of claim 1, wherein said second stage portion is attached to a venturi top or bottom section that includes one or more vanes within said venturi top or bottom section such that air flow continues through said second stage portion and enters said venturi top or bottom section that includes one or more vanes, and exhausts through a low-pressure zone created by said venturi top or bottom section.

3. The one or more multistage wind turbines zone of claim 2, wherein said low-pressure zone contains a pressure lower than ambient pressure.

4. The one or more multistage wind turbines of claim 1, wherein said conical portion includes one or more curved sections.

5. The one or more multistage wind turbines of claim 1, wherein said conical portion includes one or more curved vanes.

6. The one ore more multistage wind turbines of claim 1, wherein said first stage portion and said second stage portion are an initial tandem stage and further comprising one or more sets of additional tandem stages added to said initial tandem stage.

7. The one or more multistage wind turbines of claim 1, wherein said at least one energy conversion device includes a generator that operates by rotation of said one or more rotational drive shafts, wherein said generator includes a tachometer that measures rotational speed of said one or more rotational drive shafts and a controller that controls an ability to convert kinetic mechanical energy from said one or more rotational drive shafts of said generator to an output load energy, wherein said controller utilizes measurement of said rotational speed of said one or more rotational drive shafts to control conversion of a desired amount of said kinetic mechanical energy to said output load energy.

8. The one or more multistage wind turbines of claim 7, wherein wind energy is a form of kinetic energy that is subsequently converted into said output load energy that is electrical energy, mechanical energy and/or thermal energy.

9. The one or more multistage wind turbines of claim 7, wherein said generator is selected from: an induction generator, a hydraulic power unit including a pump, an air compressor, a synchronous electrical generator, a variable reluctance generator wherein reluctance is a measurement of an ability of a magnetic field to pass through a substance, an electric motor, a permanent magnet electric motor, a brush motor, and an electrostatic motor.

10. The one or more multistage wind turbines of claim 7, wherein said controller provides for connection and engagement of said generator with one or more valves that control conversion to said output load energy, wherein said output load energy is an output energy that is measured by utilization of shaft speed by said tachometer.

11. The one or more multistage wind turbines of claim 10, wherein said predetermined speed is dependent on a minimum amount of energy conversion that produces an amount of energy needed to provide useful output load energy, wherein said useful output load energy is defined as energy that must be greater than a minimum potential and/or inertial energy required to operate devices.

12. A network of the one or more multistage wind turbines of claim 1.

13. The network of one or more multistage wind turbines of claim 12, wherein said network includes one or more controllers that control said multistage wind turbines.

14. The network of one or more multistage wind turbines of claim 12, wherein said network communicates via energized signals sent as wired or wireless signals via light beams, lasers, transmission or receiver power lines, and to and from satellites.

15. The network of the one or more multistage wind turbines of claim 12, wherein said network is further controlled by bidirectional signals transmitted from one more local or remote controllers that can transmit, receive, or transceive said signals and that include data storage capabilities which are securitized and/or encrypted.

16. A method for obtaining energy and power efficiency from wind comprising; utilizing one or more multistage wind turbines, said one or more wind turbines having: a first stage portion with a first static stator and a vertical axis dynamic rotor that has vertical axis turbine blades mechanically connected to one or more rotational drive shafts that rotate said one or more rotational drive shafts in either a clockwise or counterclockwise direction and a second stage portion with a stationary conical portion and a second vertical axis dynamic rotor that includes second rotor axial turbine blades mechanically connected to said one or more rotational drive shafts, wherein said first stage portion utilizes airflow that continues into said vertical axis wind turbine blades from wind sources to provide torque that overcomes an inertial static force of said one or more rotational drive shafts so that said vertical axis turbine blades cause rotation of said one or more rotational drive shafts and wherein wind continues past said vertical axis turbine blades through said conical portion, which is contained within said vertical axis dynamic rotor, and toward said second rotor axial turbine blades wherein said one or more rotational drive shafts provides energy to at least one energy conversion device.

17. The method of claim 16, for each multistage wind turbine: wherein said second stage portion is attached to an air exhaust venturi top or bottom section that includes one or more vanes within said air exhaust venturi top or bottom section such that air flow escapes through an enhanced low-pressure zone created by said air exhaust venturi top section.

18. The method of claim 17, wherein said low-pressure zone contains a pressure lower than ambient pressure.

19. The method of claim 16, wherein for each multistage wind turbine: said conical portion includes one or more curved sections.

20. The method of claim 16, wherein for each multistage wind turbine: said conical portion includes one or more curved vanes.

21. The method of claim 16, wherein for each multistage wind turbine: said first and second stages are an initial tandem stage and further comprising one or more sets of additional tandem stages added to said initial tandem stage.

22. The method of claim 16, each multistage wind turbine further including: the at least one energy conversion device including a generator operating by converting energy from rotation of said one or more single rotational drive shafts, wherein said generator includes a tachometer measuring rotational speed of said one or more rotational drive shafts and a controller for controlling an ability to convert kinetic mechanical energy from said one or more rotational drive shafts of said generator to an output load energy wherein said controller utilizes measurement of said rotational speed of said one or more rotational drive shafts in order to allow controlling conversion of a desired amount of said kinetic mechanical energy to said output load energy.

23. The method of claim 22, wherein wind energy is a form of kinetic energy that is subsequently converted into said output load energy, wherein said output load energy is electrical energy, mechanical energy and/or thermal energy.

24. The method of claim 22, wherein for each multistage wind turbine: said generator is selected from: an induction generator, a hydraulic power unit including a pump, an air compressor, a synchronous electrical generator, a variable reluctance generator wherein reluctance is a measurement of an ability of a magnetic field to pass through a substance, an electric motor, a permanent magnet electric motor, a brush motor, and an electrostatic motor.

25. The method of claim 22, wherein for each multistage wind turbine: said controller also provides for connection and engagement of said generator with one or more valves that control flow of converted energy to said output load energy, wherein said output load energy is an output energy that is measured by utilization of shaft speed by said tachometer.

26. The method of claim 25, wherein said predetermined speed is dependent on a minimum amount of energy conversion that produces an amount of energy needed to provide useful output load energy, wherein said useful output load energy must be greater than a potential and/or inertial energy required to operate devices.

* * * * *